United States Patent
Kim

(10) Patent No.: US 9,509,165 B2
(45) Date of Patent: Nov. 29, 2016

(54) APPARATUS AND METHOD FOR CONTROLLING CHARGE CURRENT IN PORTABLE TERMINAL

(71) Applicant: Samsung Electronics Co., Ltd., Gyeonggi-do (KR)

(72) Inventor: Sang-Soon Kim, Gyeonggi-do (KR)

(73) Assignee: Samsung Electronics Co., Ltd., Yeongtong-gu, Suwon-si, Gyeonggi-do (KR)

( * ) Notice: Subject to any disclaimer, the term of this patent is extended or adjusted under 35 U.S.C. 154(b) by 440 days.

(21) Appl. No.: 13/660,231

(22) Filed: Oct. 25, 2012

(65) Prior Publication Data

US 2013/0099758 A1    Apr. 25, 2013

(30) Foreign Application Priority Data

Oct. 25, 2011    (KR) .................. 10-2011-0109282

(51) Int. Cl.
*H02J 7/06*    (2006.01)
*H02J 7/00*    (2006.01)

(52) U.S. Cl.
CPC .............. *H02J 7/0077* (2013.01); *H02J 7/008* (2013.01)

(58) Field of Classification Search
CPC ........................... H02J 7/008; H02J 7/0077
USPC .................. 320/164, 162, 107, 128, 137
See application file for complete search history.

(56) References Cited

U.S. PATENT DOCUMENTS

| | | | | |
|---|---|---|---|---|
| 6,495,989 B1 * | 12/2002 | Eguchi | ............... | G01R 31/3662 320/130 |
| 7,502,949 B2 * | 3/2009 | Park | .................. | G06F 1/263 320/110 |
| 7,816,956 B2 * | 10/2010 | Har | .................. | G06F 1/24 327/142 |
| 8,098,506 B2 | 1/2012 | Saint-Pierre | | |
| 8,350,374 B2 * | 1/2013 | Seong | ................ | H01L 23/50 257/686 |
| 8,618,773 B2 * | 12/2013 | Yang | ................ | H01M 10/441 320/127 |
| 8,793,086 B2 * | 7/2014 | Geris | ................ | G01R 31/40 324/76.11 |

(Continued)

FOREIGN PATENT DOCUMENTS

| | | |
|---|---|---|
| CN | 1426151 A | 6/2003 |
| CN | 101483351 A | 7/2009 |

(Continued)

OTHER PUBLICATIONS

Chinese Search Report, dated Jun. 20, 2016.

*Primary Examiner* — M'Baye Diao
(74) *Attorney, Agent, or Firm* — Cha & Reiter, LLC

(57) ABSTRACT

An apparatus and method enable a charging power supply for a battery charge in a portable terminal regardless of the charge capacity of a charge cable for an external power supply. The apparatus for controlling a charge current in the portable terminal includes a detector for detecting power supplied to a battery and a charge capacity of a charge cable when the charge cable is connected to supply external power, and a charge integrated circuit (IC) for resetting a charge capacity of the portable terminal according to the capacity of the charge cable and controlling the power supplied to the battery according to an operation of the detector, when the charge capacity of the charge cable detected by the detector is not equal to the charge capacity of the portable terminal.

6 Claims, 3 Drawing Sheets

(56) References Cited

U.S. PATENT DOCUMENTS

| | | | |
|---|---|---|---|
| 8,830,036 B2* | 9/2014 | Park | H02J 7/0052 320/108 |
| 8,847,557 B2* | 9/2014 | Park et al. | 320/137 |
| 9,136,724 B2* | 9/2015 | Ye | H02J 7/0068 |
| 9,197,086 B2* | 11/2015 | Zhou | H02J 7/0052 |
| 2008/0169705 A1* | 7/2008 | Tan | H01M 10/44 307/66 |
| 2009/0295339 A1* | 12/2009 | Wong | 320/162 |
| 2010/0217466 A1* | 8/2010 | Ichikawa | 701/22 |
| 2011/0095722 A1* | 4/2011 | Chang | 320/107 |
| 2011/0279078 A1* | 11/2011 | Hara et al. | 320/107 |
| 2011/0285350 A1* | 11/2011 | Mitsutani | 320/109 |
| 2011/0305043 A1* | 12/2011 | Matsumoto | 363/21.01 |
| 2012/0062181 A1* | 3/2012 | Lee et al. | 320/138 |
| 2012/0101750 A1* | 4/2012 | Chen et al. | 702/60 |
| 2012/0326656 A1 | 12/2012 | Ikeda | |
| 2013/0013238 A1* | 1/2013 | Kawakita | H02J 7/044 702/63 |

FOREIGN PATENT DOCUMENTS

| | | |
|---|---|---|
| CN | 201290022 Y | 8/2009 |
| CN | 101820177 A | 9/2010 |
| CN | 201656537 U | 11/2010 |
| JP | 10-327536 A | 12/1998 |

* cited by examiner

APPARATUS AND METHOD FOR CONTROLLING CHARGE CURRENT IN PORTABLE TERMINAL

CLAIM OF PRIORITY

This application claims, pursuant to 35 U.S.C. §119, priority to and the benefit of the earlier filing date of a Korean application filed in the Korean Intellectual Property Office on Oct. 25, 2011 and assigned Serial No. 10-2011-0109282, the contents of which are incorporated herein by reference.

BACKGROUND OF THE INVENTION

1. Field of the Invention

The present invention relates generally to a power supply apparatus of a portable terminal, and in particular, to an apparatus and method for enabling a power supply for charging a battery in a portable terminal regardless of the charge capacity of a charge cable of an external power supply.

2. Description of the Related Art

Recently, the use of portable terminals is rapidly increasing due to their portability. Thus, service providers (terminal manufacturers) are competitively developing portable terminals with more convenient functions in order to attract more users.

For example, portable terminals provide various functions such as a phone book, a game, a scheduler, a Short Message Service (SMS), a Multimedia Message Service (MMS), an Internet service, an Electronic (E)-mail service, a wake-up call, a Motion Picture Expert Group (MPEG) Audio Layer-3 (MP3) player, and a digital camera.

The portable terminal uses a rechargeable battery in order to provide the advantage of mobility. However, the rechargeable battery has a limited capacity to be charged, and the lifetime of the rechargeable battery decreases with an increase in the use time of the portable terminal. Therefore, when a user of the portable terminal is out or is in long-term travel, the user always has to check the charged state of the rechargeable battery and has to charge the rechargeable battery by an external power supply.

In general, a separate charger, such as a travel charger (TC) or a travel adapter (TA), is used to charge the rechargeable battery by an external power supply.

The charger converts available power, such as power from home-based electrical outlets in the range of 110-220 VAC, or power supplied from a computer, into DC power necessary to charge the portable terminal, and provides the DC power to the portable terminal. The portable terminal charges the battery by the DC power, and operates by the power supplied from the charged battery.

In general, the portable terminal controls the external power supply of a charge Integrated Circuit (IC) by detecting the voltage and current of charging power provided to the battery. Herein, the voltage and current of charging power provided to the battery is the output voltage and output current of the charge IC.

Specifically, when the output voltage of charging power provided to the battery is higher than a predetermined threshold value (for example, 4.2 volt), the portable terminal interrupts the charging power supply to the battery to avoid damaging the charging electronics or the battery.

Also, when the output current of charging power provided to the battery is larger than a predetermined threshold value (for example, 1,000 mA), the portable terminal interrupts the charging power supply to the battery to avoid damaging the charging electronics or the battery.

Accordingly, the portable terminal controls an operation of the charge IC so that the output voltage/current value satisfies the predetermined threshold value.

However, a charge capacity, which means the charge capacity of a charge cable supportable by the portable terminal to provide appropriate or maximum allowable values of voltage and current to charge a device, is set in the portable terminal.

Accordingly, the portable terminal cannot charge the battery when the charge capacity of a charge cable connected to the portable terminal does not correspond to the charge capacity of the portable terminal.

Charge cables supporting various charge capacities are popularized, and a user may have a plurality of charge cables. However, the user can use only the charge cable suitable for a charge capacity set in a portable terminal.

What is therefore required is an apparatus and method for charging a battery in a portable terminal by using charge cables of various capacities.

SUMMARY OF THE INVENTION

Accordingly, the present invention has been made to solve the above-stated problems occurring in the prior art, and an aspect of the present invention provides an apparatus and method for improving the charging performance of a portable terminal.

Another aspect of the present invention is to provide an apparatus and method for charging a battery in a portable terminal by using charge cables of various capacities.

Another aspect of the present invention is to provide an apparatus and method for resetting a charge capacity in a portable terminal according to the charge capacity of a connected charge cable.

According to an aspect of the present invention, an apparatus for controlling a charging current in a portable terminal is provided. The apparatus includes a detector for detecting power supplied to a battery and a charge capacity of a charge cable when the charge cable is connected to supply external power; and a charge IC for resetting a charge capacity of the portable terminal according to the charge capacity of the charge cable and controlling the power supplied to the battery according to an operation of the detector, when the charge capacity of the charge cable detected by the detector is not equal to the charge capacity of the portable terminal.

According to another aspect of the present invention, a method for controlling a charging current in a portable terminal is provided. The method includes operating a detector to detect power supplied to a battery and a charge capacity of a charge cable when the charge cable is connected to supply external power; resetting a charge capacity of the portable terminal according to the charge capacity of the charge cable when the charge capacity of the charge cable detected by the detector is not equal to the charge capacity of the portable terminal; and controlling the power supplied to the battery according to an operation of the detector.

BRIEF DESCRIPTION OF THE DRAWINGS

The above and other objects, features and advantages of the present invention will become more apparent from the following detailed description when taken in conjunction with the accompanying drawings in which.

DETAILED DESCRIPTION OF THE INVENTION

Preferred embodiments of the present invention will be described herein below with reference to the accompanying drawings. In the following description, detailed descriptions of well-known functions or configurations will be omitted since they would unnecessarily obscure the subject matters of the present invention. This invention may, however, be embodied in many different forms and should not be construed as limited to the exemplary embodiments set forth herein. The same reference numbers are used throughout the drawings to refer to the same or like parts. Also, terms described herein, which are defined considering the functions of the present invention, may be implemented differently depending on user and operator's intention and practice. Therefore, the terms should be understood on the basis of the disclosure throughout the specification. The principles and features of this invention may be employed in varied and numerous embodiments without departing from the scope of the invention.

Furthermore, although the drawings represent exemplary embodiments of the invention, the drawings are not necessarily to scale and certain features may be exaggerated or omitted in order to more clearly illustrate and explain the present invention.

Among the terms set forth herein, a terminal refers to any kind of device capable of processing data which is transmitted or received to or from any external entity. The terminal may display icons or menus on a screen to which stored data and various executable functions are assigned or mapped. The terminal may include a computer, a notebook, a tablet PC, a mobile device, and the like.

Among the terms set forth herein, a screen refers to a display or other output devices which visually display information to the user, and which optionally are capable of receiving and electronically processing tactile inputs from a user using a stylo, a finger of the user, or other techniques for conveying a user selection from the user to the output devices.

Figure 1:
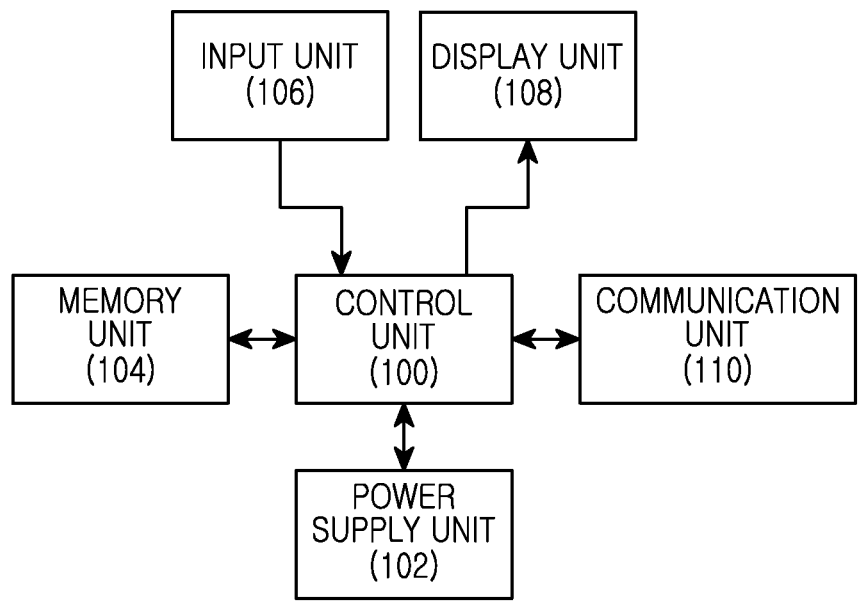
FIG. 1 is a block diagram illustrating the configuration of a portable terminal according to the present invention.

FIG. 1 is a block diagram illustrating the configuration of a portable terminal according to the present invention.

Referring to FIG. 1, a portable terminal according to the present invention may include a control unit 100, a power supply unit 102, a memory unit 104, an input unit 106, a display unit 108, and a communication unit 110.

The control unit 100 controls an overall operation of the portable terminal. For example, the control unit 100 processes and controls voice communication and data communication. In addition to the general functions, according to the present invention, the control unit 100 resets a charge capacity, which means the charge capacity of a charge cable supportable by the portable terminal for charging the power supply unit 102, according to the charge capacity of a charge cable, to enable the use of charge cables of various capacities.

That is, the control unit 100 detects the voltage of charging power, which is provided from a charge cable connected to the portable terminal, to determine whether the charge capacity of the charge cable corresponds to the charge capacity of the portable terminal, and resets the charge capacity of the portable terminal according to the charge capacity of the charge cable.

The power supply unit 102 includes a charge IC to control the supply of charging power provided thereto from the charge cable. The power supply unit 102 may detect the output voltage and current of the charge IC to control the power supplied to a battery. For example, when the output voltage of the charge IC is higher than a predetermined voltage (for example, 4.2 volt), or/and when the output current of the charge IC is higher than a predetermined current (for example, 1,000 mA), and therefore, charging is larger than the charge capacity of the portable terminal, the portable terminal interrupts the supply of charging power through the charge IC to the battery.

In addition, the power supply unit 102 may detect the input voltage of the charge IC to control the charge capacity of the portable terminal. Herein, the charge capacity of the portable terminal is the charge capacity of a charge cable supportable by the portable terminal.

That is, when external power is not able to be supplied because the charge capacity of a charge cable connected to the portable terminal is different from the charge capacity of the portable terminal, the power supply unit 102 resets the charge capacity of the portable terminal according to the charge capacity of the charge cable.

The memory unit 104 includes at least one of a ROM, a RAM, and a flash ROM. The ROM stores various reference data and microcodes of a program for the processing and control of the control unit 100 and the power supply unit 102.

The RAM is a working memory of the control unit 100, which stores temporary data that are generated during the execution of various programs. The flash ROM stores various updatable data such as a phone book, outgoing messages, and incoming messages of the portable terminal. According to an exemplary embodiment of the present invention, the flash ROM stores the charge capacity value of the portable terminal that is reset by the power supply unit 102.

The method described hereunder of the present invention may be provided as one or more instructions in one or more software modules stored in the memory unit 104. The software modules may be executed by the control unit 100.

The input unit 106 includes keys associated with a plurality of symbols, such as alphanumeric symbols, including numeric keys for digits 0-9 and a plurality of function keys, such as a Menu key, a Cancel (Delete) key, a Confirmation key, a Talk key, an End key, an Internet connection key, Navigation keys (or Direction keys), and character input keys. The input unit 106 provides the control unit 100 with key input data that corresponds to a key pressed by the user.

The display unit 108 displays numerals and characters, moving pictures, still pictures, and status information generated during an operation of the portable terminal. The display unit 108 may include at least one of a color liquid crystal display (LCD) and an active-matrix organic light-emitting diode (AMOLED). If the display unit 108 has a touch input device and is applied to a touch input type portable terminal, the display unit 108 can be used as an input device.

In fact, it is within the spirit and scope of the presently claimed invention that the input unit 106 and display unit 108 could all be served by a single touch screen. That is, a touch sensitive display, called as a touch screen, may be used as the display unit 108 as well as the input unit 106. In this situation, touch input may be performed via the touch sensitive display.

The communication unit 110 transmits/receives Radio Frequency (RF) signals inputted/outputted through an antenna (not illustrated). For example, in a transmitting (TX) mode, the communication unit 110 channel-encodes, spreads and RF-processes TX data prior to transmission. In a receiving (RX) mode, the communication unit 110 converts a received RF signal into a baseband signal and despreads and channel-decodes the baseband signal to restore the original data.

The above configuration should be considered in descriptive sense only and not for the purpose of limitation, and those skilled in the art will understand that various changes may be made therein without departing from the scope of the present invention. For example, although separate units, such as the power supply unit 102, are provided for respective functions of the control unit 100, the control unit 100 may be configured to also perform all or some of the respective functions on behalf of such separate units.

According to the present invention, for example, an electronic device comprises one or more of a controller, a touch screen, a memory, and one or more software modules stored in the memory configured for execution by the controller, and the software modules comprise one or more instructions to perform the methods described hereunder.

Figure 2:
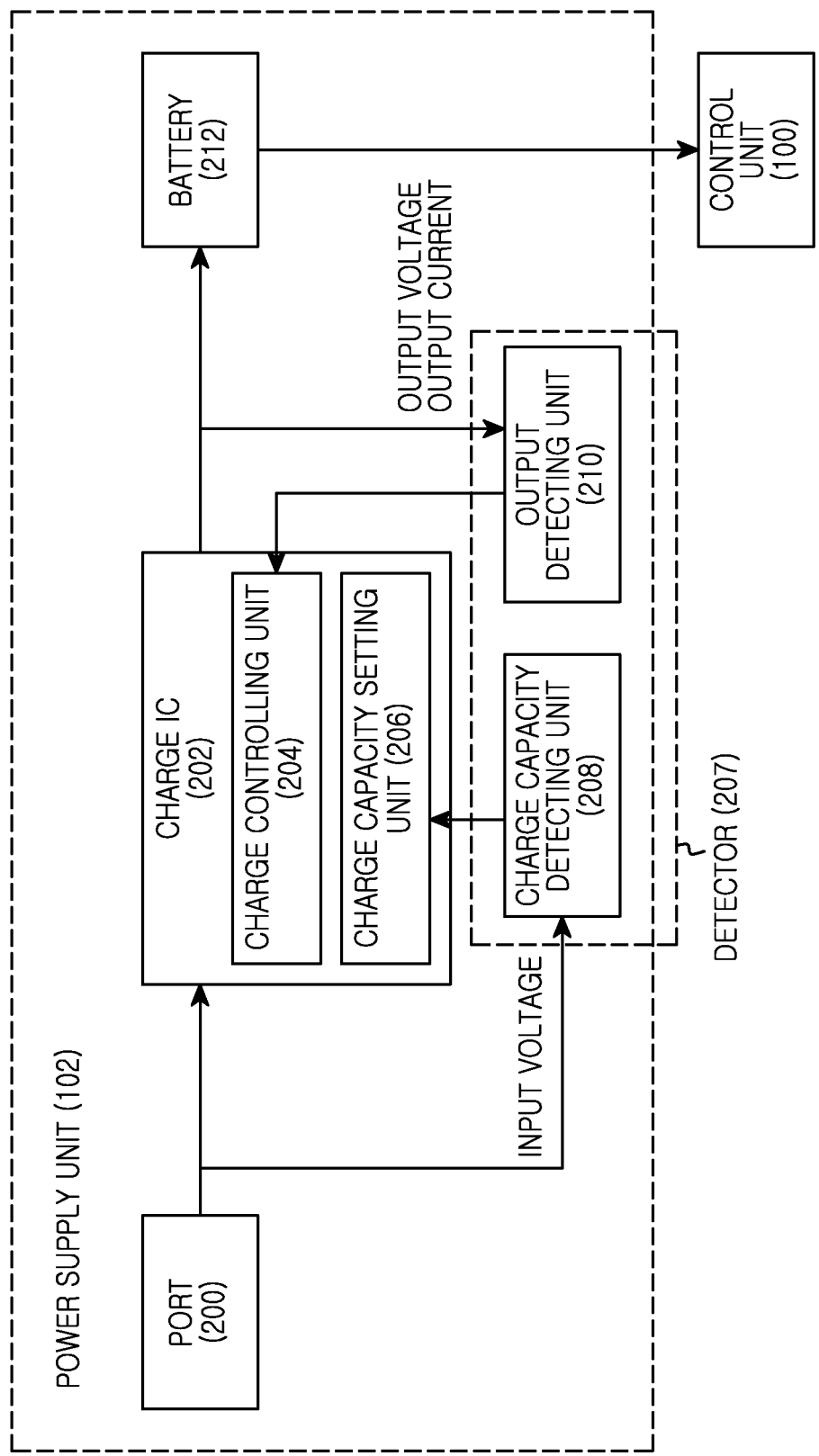
FIG. 2 is a block diagram illustrating the configuration of a power supply unit according to an exemplary embodiment of the present invention.

FIG. 2 is a block diagram illustrating the configuration of the power supply unit 102 according to the exemplary embodiment of the present invention.

Referring to FIG. 2, the power supply unit 102 according to the exemplary embodiment of the present invention may include a port 200, a charge IC 202, a detector 207, and a battery 212. The charge IC 202 may include a charge controlling unit 204 and a charge capacity setting unit 206. The detector 207 may include a charge capacity detecting unit 208 and an output detecting unit 210.

The port 200 may be connected to a charge cable for an external power supply. The port 200 may optionally be disconnected from the charge cable when charging is not desired or when charging is completed. The port 200 receives external power, which is supplied through the charge cable from the external power supply, and provides the external power to the charge IC 202.

The charge IC 202 changes the external power, which is received from the external power supply through the port 200, into power suitable for charging the battery 212. For example, the charge IC 202 drops 5V external power, received from the port 200, to 4V charging power, and provides the 4V charging power to the battery 212 to charge the battery 212. It is understood that other voltage values of the external power and the charging power to the battery 212 may be used, depending on the operating characteristics of the components.

The charge controlling unit 204 of the charge IC 202 controls the supply of charging power to the battery 212 by using the output voltage and output current of the charge IC 202 detected by the output detecting unit 210 of the detector 207. For example, when the output voltage of the charge IC 202 is higher than a predetermined voltage, or when the output current of the charge IC 202 is larger than the charge capacity of the portable terminal, the charge controlling unit 204 interrupts the supply of charging power through the charge IC 202 to the battery 212 to avoid damaging the electronic components of the portable terminal.

The charge capacity setting unit 206 of the charge IC 202 sets the charge capacity of the portable terminal according to the capacity of a connected charge cable, by using the input voltage of the charge IC 202 detected by the charge capacity detecting unit 208 of the detector 207. Accordingly, charging power can be supplied to the battery 212 even when the charge capacity of a charge cable connected to the portable terminal is different from the charge capacity of the portable terminal.

For example, when the charge capacity detecting unit 208 detects that a 500 mA charge cable is connected to the portable terminal, the charge capacity setting unit 206 resets a preset or previously set charge capacity '700 mA' of the portable terminal to 500 mA. For example, circuits known in the art, using internal switches or other components such as capacitors and rectifiers, may be connected to the charge cable to receive and handle the higher or lower values of currents and voltages of the charging power provided by the charge cable.

The battery 212 charges by using the charging power received from the charge IC 202, and supplies power to the control unit 100 for an operation of the portable terminal.

The output detecting unit 210 of the detector 207 detects the voltage and current of the charging power provided through the charge IC 202 to the battery 212 (i.e., the output voltage and output current). This is to control the power supplied to the battery 212.

That is, the output detecting unit 210 detects the output voltage and output current of the charge IC 202, determines whether to supply power to the battery 212, and provides the power to the charge controlling unit 204.

For example, when the output voltage of the charge IC 202 is higher than a predetermined output voltage (e.g., 4.2 V), the output detecting unit 210 interrupts power supplied to the battery 212. Also, when the output current of the charge IC 202 is larger than a charge capacity (e.g., 1000 mA) set in the portable terminal, the output detecting unit 210 interrupts power supplied to the battery 212.

The charge capacity detecting unit 208 of the detector 207 detects the input voltage of the charge IC 202 to detect the charge capacity of a charge cable connected to the portable terminal; for example, the charge capacity is determined from voltages and currents on the charge cable in a manner known in the art.

For example, when detecting that the input voltage of the charge IC 202 is lower than a predetermined value, the charge capacity detecting unit 208 determines that a charge cable having a charge capacity lower than the charge capacity of the portable terminal is connected to the portable terminal, and controls the charge capacity of the portable terminal according to the charge capacity of the charge cable.

The method performed using the apparatus according to FIG. 2 may be provided as one or more instructions in one or more software modules stored in a storage unit, such as the memory unit 104. In that case, the software modules may be executed by the control unit 100.

Figure 3:
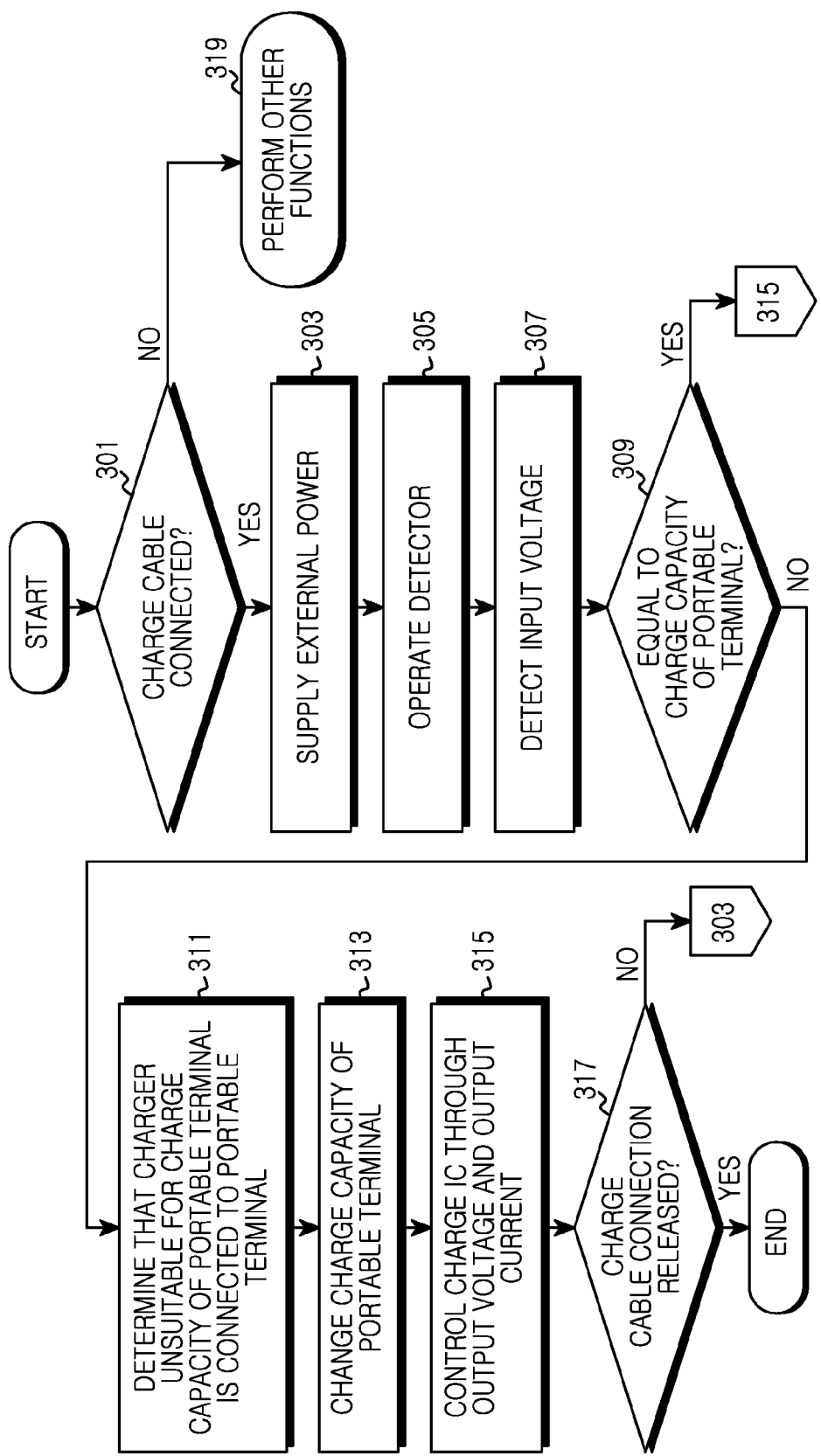
FIG. 3 is a flow diagram illustrating a process for charging a battery in a portable terminal according to the exemplary embodiment of the present invention.

FIG. 3 is a flow diagram illustrating a process for charging a battery in a portable terminal according to the exemplary embodiment of the present invention.

Referring to FIG. 3, in step 301, the portable terminal determines whether a charge cable for an external power supply is connected to the portable terminal. Herein, charge cables connectable to the portable terminal may have different charge capacities.

If the charge cable is not connected to the portable terminal in step 301, the portable terminal proceeds to step 319 to perform other functions e.g., to operate the portable terminal in an idle mode.

On the other hand, if the charge cable is connected to the portable terminal in step 301, the portable terminal proceeds to step 303. In step 303, the portable terminal receives external power supplied through the charge cable and provides the external power to a charge IC of a charge managing unit. For example, as shown in FIG. 2, the charge IC may be the charge IC 202, and the charge managing unit may be the power supply unit 102. In step 305, the portable terminal operates a detector, such as the detector 207 in FIG. 2. Herein, the detector 207 includes an output detecting unit 210 for detecting, in step 307, the voltage and current of charging power outputted from the charge IC 202 (i.e., the output voltage and output current), and a charge capacity detecting unit 208 for detecting the input voltage of charging power inputted to the charge IC 202 of the charge managing unit. The output detecting unit 210 detects the output of the charge IC 202, in step 307, to determine whether to supply charging power. The charge capacity detecting unit 208 detects the charge capacity of the charge cable connected to the portable terminal.

In general, the portable terminal measures only the output voltage and the output current through the output detecting unit 210, and controls the current of the charge IC 202 so that the output voltage does not exceed a predetermined output voltage (e.g., 4.2 V) and the output current does not exceed a current (e.g., 1000 mA) set in the portable terminal.

However, in addition to the above operation, the present invention changes a charge capacity set in the portable terminal, by using the input voltage of the charge IC 202 detected through the charge capacity detecting unit 208. This is to enable the use of other charge cables as well as a charge cable corresponding to the charge capacity set in the portable terminal.

Accordingly, in step 307 in FIG. 3, the portable terminal detects the input voltage of the charge IC 202 through the charge capacity detecting unit 208. In step 309, the portable terminal determines whether the charge capacity of the charge cable is substantially equal to the charge capacity of the portable terminal. That is, in step 309, the portable terminal determines whether the input voltage of the charge IC differs over a predetermined threshold range. For example, when a charge cable, having a capacity lower than the charge capacity set in the portable terminal, is connected to the portable terminal, the input voltage of the charge IC 202 will drop rapidly.

If the charge capacity of the charge cable is substantially equal to the charge capacity of the portable terminal in step 309, the portable terminal proceeds to step 315. In step 315, the portable terminal controls the charge IC 202 through control of the output voltage and the output current. This is to control the charge IC 202 through control of the output voltage and the output current of the charge IC as in a conventional portable terminal, because the charge cable suitable for the portable terminal is connected to the portable terminal.

On the other hand, referring back to step 309, if the charge capacity of the charge cable is not equal to the charge capacity of the portable terminal as detected in step 309, the portable terminal proceeds to step 311. It is to be understood that the term "equal", as used herein when comparing charge capacities, may include a predetermined range of values in which compared charge capacities are considered equal within operating tolerance limits. Accordingly, the term "not equal" indicates that two compared charge capacities are not within the predetermined range of values. For example, two charge capacities which, when compared, are within 1% in value of each other are considered equal, while, for example, two charge capacities having one value greater than the other by 1% are not considered equal. In step 311, the portable terminal determines that a charger, unsuitable for the charge capacity of the portable terminal, is connected to the portable terminal. In step 313, the portable terminal changes the set or preset charge capacity of the portable terminal. The portable terminal changes the set charge capacity to be substantially equal to the charge capacity of the connected charge cable.

In step 315, the portable terminal controls the charge IC 202 through control of the output voltage and the output current. In step 317, the portable terminal determines whether the connection of the charge cable is released or removed, for example, by disengaging the charge cable from the port 200 in FIG. 2.

If the connection of the charge cable is maintained in step 317, the portable terminal returns to step 303 to receive external power.

On the other hand, if the connection of the charge cable is released in step 317, the portable terminal ends the method of FIG. 3, performed according to the present invention.

The method performed according to FIG. 3 may be provided as one or more instructions in one or more software modules stored in the storage unit, such as the memory unit 104. In that case, the software modules may be executed by the control unit 100.

It will be appreciated that embodiments of the present invention according to the claims and description in the specification can be realized in the form of hardware, software or a combination of hardware and software.

Any such software may be stored in a computer readable storage medium. The computer readable storage medium stores one or more programs (software modules), the one or more programs comprising instructions, which when executed by one or more processors in an electronic device, cause the electronic device to perform a method of the present invention.

Any such software may be stored in the form of volatile or non-volatile storage such as, for example, a storage device like a ROM, whether erasable or rewritable or not, or in the form of memory such as, for example, RAM, memory chips, device or integrated circuits or on an optically or magnetically readable medium such as, for example, a CD, DVD, magnetic disk or magnetic tape or the like. It will be appreciated that the storage devices and storage media are embodiments of machine-readable storage that are suitable for storing a program or programs comprising instructions that, when executed, implement embodiments of the present invention.

Accordingly, embodiments provide a program comprising code for implementing the apparatus or a method as claimed in any one of the claims of this specification and a machine-readable storage storing such a program. Still further, such programs may be conveyed electronically via any medium such as a communication signal carried over a wired or wireless connection and embodiments suitably encompass the same.

Therefore, the above-described apparatus and methods according to the present invention can be implemented in hardware, firmware or as software or computer code that can be stored in a recording medium such as a CD ROM, a RAM, a ROM, a floppy disk, DVDs, a hard disk, a magnetic storage media, an optical recording media, or a magneto-optical disk or computer code downloaded over a network originally stored on a remote recording medium, a computer readable recording medium, or a non-transitory machine readable medium and to be stored on a local recording medium, so that the methods described herein can be rendered in such software that is stored on the recording medium using a general purpose computer, a digital computer, or a special processor or in programmable or dedicated hardware, such as an ASIC or FPGA. As would be understood in the art, the computer, the processor, microprocessor controller or the programmable hardware include memory components, e.g., RAM, ROM, Flash, etc. that may store or receive software or computer code that when accessed and executed by the computer, processor or hardware implement the processing methods described herein. In addition, it would be recognized that when a general purpose computer accesses code for implementing the processing shown herein, the execution of the code transforms the general purpose computer into a special purpose computer for executing the processing shown herein.

As described above, the present invention resets the charge capacity of the portable terminal according to the charging capacity of the connected charge cable in order to improve the charge performance of the portable terminal, thus making it possible to charge the battery by using charge cables of various capacities.

While the invention has been shown and described with reference to certain exemplary embodiments thereof, it will be understood by those skilled in the art that various changes in form and details may be made therein without departing from the spirit and scope of the invention as defined by the appended claims. Therefore, the scope of the invention is defined not by the detailed description of the invention but by the appended claims, and all differences within the scope will be construed as being included in the present invention.

What is claimed is:

1. An apparatus for controlling a charge in a portable terminal having a battery, comprising:
    a detector configured to detect an output current, an output voltage and an input voltage of a charge Integrated Circuit (IC);
    a memory configured to store a charge capacity; and
    the charge Integrated Circuit (IC) configured to identify a charge capacity of an external power supply based on the detecting when the apparatus is connecting to the external power supply, reset a charge capacity of the portable terminal in the memory according to an identified charge capacity of the external power supply and, control the output current for the input voltage of the charge IC to be maintained within a voltage range corresponding to the reset charge capacity of the portable terminal.

2. The apparatus of claim 1, wherein the charge Integrated Circuit (IC) is inputted from an external power supply.

3. The apparatus of claim 2, wherein the charge Integrated Circuit (IC) supplies power in the output current and the output voltage to the battery.

4. A method for controlling a charge in a portable terminal having a battery, comprising:
    storing a resettable charge capacity of the portable terminal in a memory;
    detecting an output current, an output voltage and an input voltage of a charge Integrated Circuit (IC);
    identifying a charge capacity of an power supply when the portable terminal is connecting with the external power supply;
    resetting a charge capacity of the portable terminal in the memory according to an identified charge capacity of the external power supply; and
    controlling, the output current for the input voltage of the charge IC to be maintained within a voltage range corresponding to the reset charge capacity of the portable terminal.

5. The method of claim 4, wherein the charge Integrated Circuit (IC) is inputted from an external power supply.

6. The method of claim 5, wherein the charge Integrated Circuit (IC) supplies power in the output current and the output voltage to the battery.

* * * * *